(12) United States Patent
Kishi et al.

(10) Patent No.: US 11,815,033 B2
(45) Date of Patent: Nov. 14, 2023

(54) CONTROL DEVICE, CONTROL INPUT DETERMINATION METHOD, AND CONTROL INPUT DETERMINATION PROGRAM

(71) Applicant: MITSUBISHI HEAVY INDUSTRIES, LTD., Tokyo (JP)

(72) Inventors: Makoto Kishi, Tokyo (JP); Ryuji Takenaka, Kanagawa (JP); Ryoichi Haga, Kanagawa (JP); Kenta Wada, Kanagawa (JP); Yasuhiro Niina, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/795,701

(22) PCT Filed: Mar. 18, 2021

(86) PCT No.: PCT/JP2021/010990
§ 371 (c)(1),
(2) Date: Jul. 27, 2022

(87) PCT Pub. No.: WO2021/200194
PCT Pub. Date: Oct. 7, 2021

(65) Prior Publication Data
US 2023/0060903 A1  Mar. 2, 2023

(30) Foreign Application Priority Data
Mar. 30, 2020 (JP) ................. 2020-060045

(51) Int. Cl.
*F02C 9/28* (2006.01)
*F02C 9/26* (2006.01)
*F02C 9/30* (2006.01)

(52) U.S. Cl.
CPC ............... *F02C 9/28* (2013.01); *F02C 9/263* (2013.01); *F02C 9/30* (2013.01)

(58) Field of Classification Search
CPC ....................................................... F02C 9/28
See application file for complete search history.

(56) References Cited

U.S. PATENT DOCUMENTS

| 2004/0123600 A1 | 7/2004 | Brunell et al. |
| 2005/0193739 A1 | 9/2005 | Brunell et al. |
| (Continued) | | |

FOREIGN PATENT DOCUMENTS

| JP | 2005-248946 | 9/2005 |
| JP | 4540955 | 9/2010 |
| (Continued) | | |

OTHER PUBLICATIONS

International Search Report dated May 18, 2021 in International Application No. PCT/JP2021/010990.

*Primary Examiner* — Katheryn A Malatek
(74) *Attorney, Agent, or Firm* — Wenderoth, Lind & Ponack, L.L.P.

(57) ABSTRACT

A control device is a device for controlling a gas turbine. The control device is provided with: a prediction unit configured to predict a future state quantity of the gas turbine corresponding to a control input to the gas turbine in a prediction horizon, using a prediction model; an optimization unit configured to optimize the control input in at least a part of the prediction horizon, using a prediction result of the prediction unit; a storage unit for storing sensitivity information indicating sensitivity of the control input to a change speed of the state quantity for each operating condition of the gas turbine; and an update unit configured to read the sensitivity information corresponding to the operating condition assumed in the prediction horizon from the storage (Continued)

unit, and update one or more coefficients of a prediction equation of the state quantity used in the prediction model.

12 Claims, 6 Drawing Sheets

(56) References Cited

U.S. PATENT DOCUMENTS

| | | | |
|---|---|---|---|
| 2013/0184961 A1 | 7/2013 | Kumar et al. | |
| 2014/0257666 A1 | 9/2014 | Arbol et al. | |
| 2016/0326967 A1* | 11/2016 | Yamamoto | F02C 9/28 |
| 2018/0223743 A1* | 8/2018 | Yamamoto | F02C 7/228 |
| 2020/0392908 A1* | 12/2020 | Yunoki | F02C 9/28 |

FOREIGN PATENT DOCUMENTS

| | | |
|---|---|---|
| JP | 2013-149248 | 8/2013 |
| JP | 2018-055169 | 4/2018 |
| JP | 6310949 | 4/2018 |

\* cited by examiner

FIG. 4

Atmosphere temperature: 30°C

| IGV | GTMW | TIT | TEX | ... | k_G1_IGV | k_GTMW_Gf | k_GTMW_G1 | k_TIT_Gf | k_TIT_G1 | k_TBP_Gf | k_TBP_G1 | k_TEX_Gf | k_TEX_G1 |
|---|---|---|---|---|---|---|---|---|---|---|---|---|---|
| deg | MW | °C | °C | ... | (kg/s)/deg | MW/(kg/s) | MW/(kg/s) | °C/(kg/s) | °C/(kg/s) | °C/(kg/s) | °C/(kg/s) | °C/(kg/s) | °C/(kg/s) |
| .... | .... | .... | .... | ... | .... | .... | .... | .... | .... | .... | .... | .... | .... |

CONTROL DEVICE, CONTROL INPUT DETERMINATION METHOD, AND CONTROL INPUT DETERMINATION PROGRAM

TECHNICAL FIELD

The present disclosure relates to a control device, a control input determination method, and a control input determination program.

The present application claims priority on Japanese Patent Application No. 2020-060045 filed Mar. 30, 2020, the entire content of which is incorporated herein by reference.

BACKGROUND ART

In gas turbines for power generation, a method for controlling important state quantities such as gas turbine output and exhaust gas temperature by operating various actuators in accordance with classical feedback control such as PID control and preset table settings has been widely used. However, such a classical control method may not provide sufficient controllability. As one solution to this problem, model predictive control has been proposed. For example, Patent Document 1 discloses a method in which a state parameter is estimated by an extended Kalman filter (EKE), and a control input is optimized using a prediction model.

CITATION LIST

Patent Literature

Patent Document 1: JP2005-248946A

SUMMARY

Problems to be Solved

However, the method disclosed in Patent Document 1 is an optimization method for ensuring performance in deterioration or failure, but not for improving control performance in normal operation. For example, in calculation by a prediction model using a prediction equation in which one or more coefficients are set based on the thermal equilibrium condition, if the one or more coefficients are fixed, sufficient prediction accuracy may not be obtained when a transient deviation from the thermal equilibrium condition occurs due to a change in operating condition.

For example, in control of the gas turbine, the operating conditions are significantly different between the case where the inlet guide vane opening degree (IGVdeg) is 50% and the case where the inlet guide vane opening degree (IGVdeg) is 100%, so that the thermal equilibrium conditions also change. Therefore, it is preferable that one or more coefficients of the prediction equation used in the prediction model are appropriately updated according to the operating condition.

In view of the above, an object of the present disclosure is to provide a control device and so on whereby it is possible to improve the prediction accuracy by updating one or more coefficients included in a prediction equation of a prediction model.

Solution to the Problems

A control device according to the present disclosure is a control device for controlling a gas turbine, comprising: a prediction unit configured to predict a future state quantity of the gas turbine corresponding to a control input to the gas turbine in a prediction horizon, using a prediction model; an optimization unit configured to optimize the control input in at least a part of the prediction horizon, using a prediction result of the prediction unit; a storage unit for storing sensitivity information indicating sensitivity of the control input to a change speed of the state quantity for each operating condition of the gas turbine; and an update unit configured to read the sensitivity information corresponding to the operating condition assumed in the prediction horizon from the storage unit, and update one or more coefficients of a prediction equation of the state quantity used in the prediction model.

A control input determination method according to the present disclosure comprises: a step of predicting a future state quantity of a gas turbine corresponding to a control input to the gas turbine in a prediction horizon by a prediction model; a step of optimizing the control input in at least a part of the prediction horizon, using a prediction result of the prediction step; a step of storing sensitivity information indicating sensitivity of the control input to a change speed of the state quantity for each operating condition of the gas turbine in a storage unit; and a step of reading the sensitivity information corresponding to the operating condition assumed in the prediction horizon from the storage unit, and updating one or more coefficients of a prediction equation of the state quantity used in the prediction model.

A control input determination program according to the present disclosure is configured to cause a computer to execute: a process of predicting a future state quantity of a gas turbine corresponding to a control input to the gas turbine in a prediction horizon, using a prediction model; a process of optimizing the control input in at least a part of the prediction horizon, using a prediction result of the prediction process; a process of storing sensitivity information indicating sensitivity of the control input to a change speed of the state quantity for each operating condition of the gas turbine in a storage unit; and a process of reading the sensitivity information corresponding to the operating condition assumed in the prediction horizon from the storage unit, and updating one or more coefficients of a prediction equation of the state quantity used in the prediction model.

Advantageous Effects

The present disclosure provides a control device and so on whereby it is possible to improve the prediction accuracy by updating one or more coefficients included in a prediction equation of a prediction model.

BRIEF DESCRIPTION OF DRAWINGS

FIG. 4 is a diagram of an example of the performance table stored in the control device according to an embodiment.

DETAILED DESCRIPTION

Embodiments will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Gas Turbine)

Figure 1:
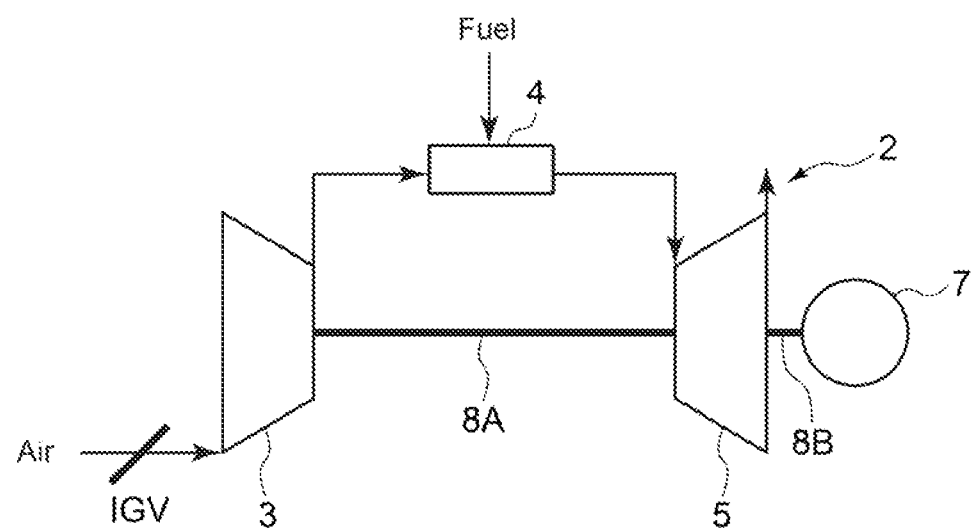
FIG. 1 is a schematic configuration diagram of a gas turbine according to an embodiment.

Hereinafter, an example of a gas turbine 2 to be controlled by a control device 100 according to an embodiment will be described. FIG. 1 is a schematic configuration diagram of a gas turbine 2 according to an embodiment. As shown in FIG. 1, a power generation device 1 includes a gas turbine 2 and a generator 7.

The gas turbine 2 is a gas turbine for power generation. The gas turbine 2 includes a compressor 3 for producing compressed air, a combustor 4 for producing combustion gas using the compressed air and fuel, and a turbine 5 configured to be driven by the combustion gas to rotate.

The compressor 3 is connected to the turbine 5 via a rotational shaft 8A. The compressor 3 is rotationally driven by rotational energy of the turbine 5 to produce compressed air. An inlet guide vane IGV is provided at the inlet side of the compressor 3. The air inflow amount is adjusted by the opening degree of the inlet guide vane IGV. The opening degree of the inlet guide vane IGV is controlled based on an inlet guide vane opening degree control command IGVCSO. The compressed air produced by the compressor 3 is supplied to the combustor 4.

The combustor 4 is supplied with fuel and the compressed air produced by the compressor 3, and combusts the fuel to produce the combustion gas that serves as a working fluid of the turbine 5. The flow rate of the fuel supplied to the combustor 4 is adjusted by a flow rate adjustment valve whose opening degree is adjusted according to a fuel flow rate command CSO. The combustion gas is sent to the turbine 5 at a latter stage from the combustor 4.

The turbine 5 is driven by the combustion gas produced by the combustor 4. The turbine 5 is connected to the generator 7 via a rotational shaft 8B. The generator 7 is configured to generate power by rotational energy of the turbine 5.

(Configuration of Control Device)

Figure 2:
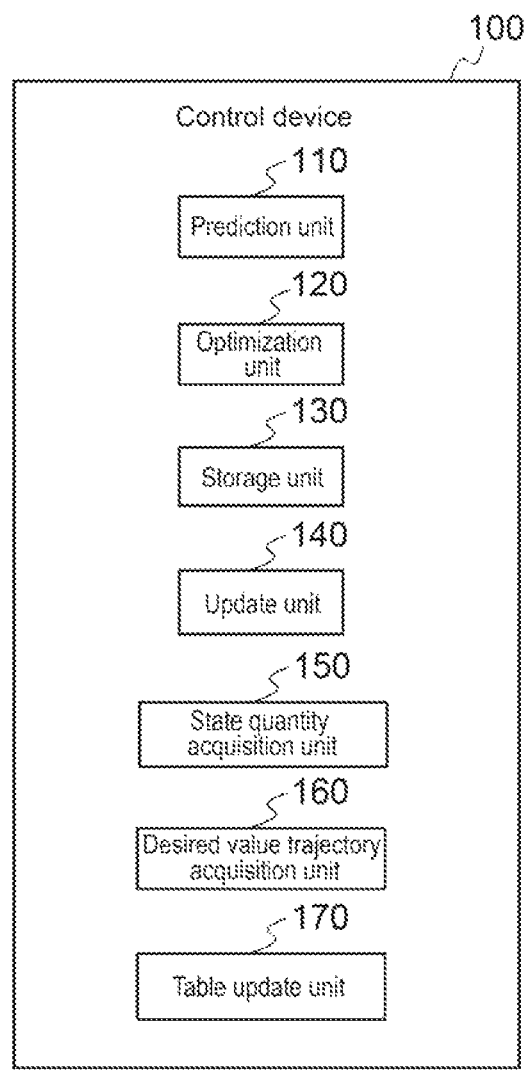
FIG. 2 is a schematic block configuration diagram of a control device according to an embodiment.

A control device 100 according to an embodiment will now be described. FIG. 2 is a schematic block configuration diagram of the control device 100 according to an embodiment. The control device 100 is a device for controlling the gas turbine 2.

The control device 100 is, for example, a computer including a central processing unit (CPU), a random access memory (RAM), and a read only memory (ROM). In the control device 100, the processor (CPU) executes a program (e.g., control input determination program) stored in the memory (RAM or ROM) to implement functions described later.

As shown in FIG. 2, the control device 100 includes a prediction unit 110, an optimization unit 120, a storage unit 130, an update unit 140, a state quantity acquisition unit 150, a desired value trajectory acquisition unit 160, and a table update unit 170.

The prediction unit 110 is configured to predict a future state quantity of the gas turbine 2 corresponding to a control input to the gas turbine 2 in a prediction horizon, using a prediction model. The control input includes the fuel flow rate command CSO and the inlet guide vane opening degree control command IGVCSO. The state quantity includes, for example, information on fuel flow rate Gf, air flow rate GI, output GTMW, turbine inlet temperature TIT, blade path temperature BPT, and exhaust gas temperature TEX of the gas turbine 2.

The control input may be a control input that includes at least one of the fuel flow rate command CSO or the inlet guide vane opening degree control command IGVCSO. The state quantity may be information different from the above-described information, or may be information that includes at least one of the above-described information. The output GTMW of the gas turbine 2 may be the output of the generator 7. In the present disclosure, "output of gas turbine" is also simply referred to as "output".

The optimization unit 120 is configured to optimize the control input in at least a part of the prediction horizon, using a prediction result of the prediction unit 110. The optimization unit 120 inputs the control input in the prediction horizon to the prediction unit 110 and acquires the prediction result.

The storage unit 130 stores sensitivity information indicating sensitivity of the control input to a change speed of the state quantity for each operating condition of the gas turbine 2. Further, the storage unit 130 stores a constraint condition, a prediction model, and a control input determination program, which will be described later. The sensitivity information includes the first sensitivity information and the second sensitivity information, as will be described later. The sensitivity information may be a performance table, which will be described later.

The update unit reads the sensitivity information corresponding to the operating condition assumed in the prediction horizon from the storage unit 130, and updates one or more coefficients of a prediction equation of the state quantity used in the prediction model. The sensitivity information corresponding to the operating condition assumed in the prediction horizon may be sensitivity information corresponding to the current operating condition.

The state quantity acquisition unit 150 is configured to acquire the state quantity of the gas turbine 2 from a sensor or the like.

The desired value trajectory acquisition unit 160 is configured to acquire a desired value trajectory of at least one parameter of the state quantity. The desired value trajectory acquisition unit 160 may be configured to acquire a desired value trajectory of a parameter of at least one of turbine inlet temperature TIT or output GTMW of the gas turbine 2 among the above-described state quantities.

The table update unit 170 is configured to update a performance table stored in the storage unit 130, based on actual data acquired during actual operation. For example, the performance table in the initial state is created based on design information. After that, the performance table is updated based on actual data acquired during actual operation.

(Prediction Model)

The prediction model used by the prediction unit 110 will be described. In some embodiments, a state space model described by a linear model may be used for the prediction model, as described below.

First, the definition of terms in the prediction equation will be described. $x(k)$ is a state quantity vector at current time k. $x(k)$ may be considered as a matrix having a plurality of state quantities as elements. $u(k)$ is a control input vector at current time k. $y(k)$ is an observed output vector at current time k. $y(k)$ may be considered as a matrix having controlled variables of some state quantities of the plurality of state quantities as elements. $z(k)$ is an evaluated output vector at current time k. A, B, $C_y$, and $C_z$ are matrices that constitute the equation of state. The matrices A and B are matrices having one or more coefficients included in the prediction equation as elements. When one or more coefficients are updated, the matrices A and B are updated.

With this definition, it can be considered that the following relational expressions hold as a function of time. These expressions can be used as the prediction equation.

$$x(k+1) = Ax(k) + Bu(k) \quad (1)$$

$$y(k) = C_y x(k) \quad (2)$$

$$z(k) = C_z x(k) \quad (3)$$

$x(k+1)$ in expression (1) is a future state quantity vector. The unit of time may be a control cycle. That is, $x(k+1)$ may be a future state quantity vector assumed when the control cycle is advanced by one cycle from current time k.

According to expression (1), the future state quantity vector $x(k+1)$ can be calculated based on the state quantity vector $x(k)$ at current time k, the control input vector $u(k)$ at current time k, and the matrices A and B. By repeating this calculation, a future state quantity vector $x(k+i)$ assumed when the control cycle is advanced by i-cycles, where i is any number, from current time k can be acquired.

According to expression (2), the observed output vector $y(k)$ at current time k can be calculated based on the state quantity vector $x(k)$ at current time k and the matrix $C_y$. According to expression (3), the evaluated output vector $z(k)$ at current time k can be calculated based on the state quantity vector $x(k)$ at current time k and the matrix $C_z$. Further, by combining the expressions (1) to (3), an observed output vector $y(k+i)$ and an evaluated output vector $z(k+i)$ corresponding to the future state quantity vector $x(k+i)$ can be calculated.

Here, the difference from the point of thermal equilibrium (which may be near the equilibrium point) in the operation of the gas turbine 2 may be considered as the state quantity x. In this case, the state quantity vector x may be defined as a matrix having, as elements, dGf, dGI, dGTMW, dTIT, dTBP, and dTEX which are differences of fuel flow rate Gf, air flow rate GI, output GTMW, turbine inlet temperature TIT, blade path temperature BPT, and exhaust gas temperature TEX from the equilibrium point. The control input u may be defined as a matrix having, as elements, dCSO and dIGVdeg corresponding to the state quantities (differences from the equilibrium point) of the fuel flow rate command CSO and the IGV opening control command IGVCSO.

More specifically, dGf, dGI, dGTMW, dTIT, dTBP, and dTEX can be expressed by the following differential equations. For example, $Gf-Gf_0$ corresponds to the difference of fuel flow rate Gf from the equilibrium point, and dGf corresponds to $d(Gf-Gf_0)$. dx/dt represents the change speed of the state quantity x. For example, $d(Gf-Gf_0)/dt$ represents the change speed of fuel flow rate Gf. The same can apply to other state quantities.

$$(Gf-Gf_0) + \tau_{Gf} \times d(Gf-Gf_0)/dt = k\_Gf\_CSO \times (CSO-CSO_0) \quad (4)$$

$$(GI-GI_0) + \tau_{GI} \times d(GI-GI_0)/dt = k\_GI\_IGV \times (IGVdeg-IGVdeg_0) \quad (5)$$

$$(GTMW-GTMW_0) + \tau_{GIMW} \times d(GTMW-GTMW_0)/dt = k\_GTMW\_Gf \times (Gf-Gf_0) + k\_GTMW\_GI \times (GI-GI_0) \quad (6)$$

$$(TIT-TIT_0) + \tau_{TIT} \times d(TIT-TIT_0)/dt = k\_TIT\_Gf \times (Gf-Gf_0) + k\_TIT\_GI \times (GI-GI_0) \quad (7)$$

$$(TBP-TBP_0) + \tau_{TBP} \times d(TBP-TBP_0)/dt = k\_TBP\_Gf \times (Gf-Gf_0) + k\_TBP\_GI \times (GI-GI_0) \quad (8)$$

$$(TEX-TEX_0)\tau_{TEX} \times d(TEX-TEX_0)/dt = k\_TEX\_Gf \times (Gf-GF_0)) + k\_TEX\_GI \times (GI-GI_0) \quad (9)$$

Expressions (4) and (5) are the first sensitivity information indicating the relationship between the change speed of the state quantity x and the control input u. These expressions indicate the sensitivity of the control input u to the change speed of the state quantity x. Expressions (6) to (9) are the second sensitivity information indicating the relationship between the first state quantities GE GI and the change speed of the second state quantities GTMW, TIT, TBP, TEX. $\tau_{Gf}$, $\tau_{GI}$, $\tau_{GIMW}$, $\tau_{TIT}$, $\tau_{TBP}$, and $\tau_{TEX}$ are respective time constants.

Such sensitivity information includes sensitivity coefficients k_Gf_CSO, k_GI_IGV, k_GTMW_Gf, k_TIT_Gf, k_TIT_GI, k_TBP_Gf, k_TBP_GI, k_TEX_Gf, and k_TEX_GI. For example, the sensitivity coefficient k_Gf_CSO is a coefficient indicating the sensitivity of fuel flow rate Gf to a change in fuel flow rate command CSO. Similarly, other sensitivity coefficients are coefficients indicating the sensitivity of the previous parameter to a change in the later parameter. As will be described later, of these sensitivity coefficients, the second sensitivity coefficients k_GTMW_Gf, k_TIT_Gf, k_TBP_GI, and k_TEX_Gf may be corrected in consideration of combustion efficiency η.

When expressions (4) to (9) are organized into matrix form, the equation of state obtained by time-differentiating the state quantity vector x is expressed by the following equation (10). The observed output vector y is expressed in matrix form by the following expression (11). The evaluated output vector z is expressed in matrix form by the following expression (12).

$$\frac{dx}{dt} = \begin{pmatrix} \frac{-1}{\tau_{Gf}} & 0 & 0 & 0 & 0 & 0 \\ 0 & \frac{-1}{\tau_{G1}} & 0 & 0 & 0 & 0 \\ \frac{K_{GTMW-Gf}}{\tau_{GTMW}} & \frac{K_{GTMW-G1}}{\tau_{GTMW}} & \frac{-1}{\tau_{GTMW}} & 0 & 0 & 0 \\ \frac{K_{T1T-Gf}}{\tau_{T1T}} & \frac{K_{T1T-G1}}{\tau_{T1T}} & 0 & \frac{-1}{\tau_{T1T}} & 0 & 0 \\ \frac{K_{TBX-Gf}}{\tau_{TBP}} & \frac{K_{TBP-G1}}{\tau_{TBP}} & 0 & 0 & \frac{-1}{\tau_{TBP}} & 0 \\ \frac{K_{TEX-Gf}}{\tau_{TEX}} & \frac{K_{TEF-G1}}{\tau_{TEX}} & 0 & 0 & 0 & \frac{-1}{\tau_{TEX}} \end{pmatrix} x + \quad (10)$$

$$\begin{pmatrix} \frac{K_{Gf-CSO}}{\tau_{Gf}} & 0 \\ 0 & \frac{K_{G1-IGV}}{\tau_{G1}} \\ 0 & 0 \\ 0 & 0 \\ 0 & 0 \\ 0 & 0 \end{pmatrix} u$$

$$y = \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{pmatrix} x \quad (11)$$

$$z = \begin{pmatrix} 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{pmatrix} x \quad (12)$$

(Optimization)

Figure 3:
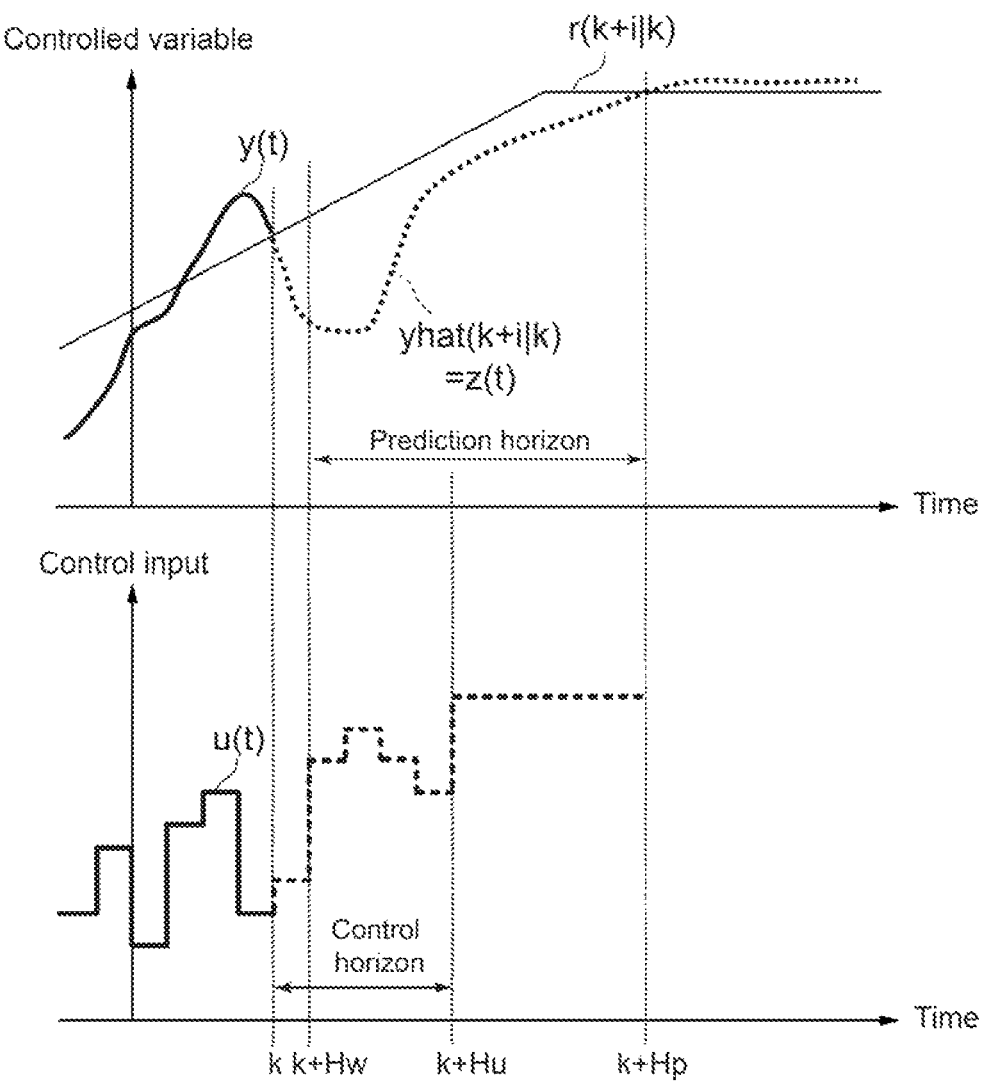
FIG. 3 is a schematic diagram for describing the principle of optimization performed by the control device according to an embodiment.

An example of optimization by the optimization unit 120 will now be described specifically. FIG. 3 is a schematic diagram for describing the principle of optimization performed by the control device 100 according to an embodiment. The upper graph of FIG. 3 shows the temporal transition of the controlled variable or the like, and the lower graph shows the temporal transition of the control input. The controlled variable is, for example, output GTMW of the gas turbine 2 and turbine inlet temperature TIT. The upper graph of FIG. 3 shows the transition of output GTMW as the controlled variable.

In the upper graph of FIG. 3, y(t) shown by the solid line represents the observed output, and z(t) shown by the dotted line represents the evaluated output. In other words, y(t) shows the transition of the actual result up to current time k, and z(t) shows the transition of the prediction result in the future (i.e., time k+i) after current time k. r(k+i|k) represents an operating line, i.e., a desired value trajectory. The desired value trajectory is acquired by the desired value trajectory acquisition unit 160. The desired value trajectory and a trajectory of the controlled variable are desirably close to each other.

The horizontal axis is the time axis, and the upper graph and the lower graph of FIG. 3 share the time axis. On the time axis, the section from evaluation start time k+Hw to time k+Hp is a prediction horizon. The section from current time k to time k+Hu is a control horizon. The control horizon is shorter than the prediction horizon.

In the lower graph of FIG. 3, the transition of the actual control input u(t) is shown by the solid line, and the transition of the control input u(t) after current time k is shown by the dashed line. The transition of the evaluated output z(t) in the upper graph is determined as a controlled variable that is predicted according to the control input u(t) after current time k in the lower graph.

The optimization unit 120 determines the control input u(t) so that the value of the control input u(t) changes in the control horizon, and determines the control input u(t) so that the value of the control input u(t) is constant after the control horizon in the prediction horizon. For example, as shown in FIG. 3, the value of the control input u(t) changes in the section from current time k to time k+Hu, whereas the value of the control input u(t) is constant in the section from time k+Hu to time k+Hp.

The constant value may be the value of the immediately previous control input u(k+Hu). Thus, calculation of the constant value may be omitted. The constant value may be the value of the control input u(t) calculated so that the evaluated output z(t) matches the reference r(k+i|k) indicating the desired value trajectory at the end of the prediction horizon (time k+Hp), as shown in FIG. 3.

The optimization unit 120 inputs the determined control input in the prediction horizon to the prediction unit 110. As a result, the transition of the evaluated output z(t) is obtained. The control input determined before input to the prediction unit 110 is not determined as the optimal control input, but is tentatively determined as a candidate for the optimal control input. That is, the dashed line portion in the lower graph of FIG. 3 indicates the control input u(t) in the middle of the optimization calculation.

For example, assuming that the control input u(t) actually used is for one control cycle immediately after the current time (that is, from current time k to time k+Hw), the prediction horizon is from the end of the first control cycle to the end of the eleventh control cycle after the current time, while the control horizon corresponds to five control cycles after the current time. In this case, the calculation value is set for the control input in five cycles, and then the constant value is set for the control input in subsequent five cycles. Based on such control inputs, the state quantity and the controlled variable are predicted for eleven cycles.

The optimization unit 120 may be configured to optimize the control input u(t), based on an evaluation function that depends on a deviation between the desired value trajectory and the controlled variable (parameter). For example, the optimization unit 120 may determine the optimal control input u(t) so as to decrease the evaluation function while referring to the prediction result described above.

Here, the evaluation function may include the first item indicating an error between the desired value trajectory and the controlled variable in the prediction horizon, and the second item indicating a cumulative value of change amount of the control input u(t) in the control horizon. For example, the evaluation function may be V shown in the following expression $$V = \sum_{k=H_w}^{H_p} \|\hat{z}(k+i\,|\,k) - r(k+i\,|\,k)\|_{Q(i)}^2 + \sum_{i=0}^{H_u-1} \|\Delta \hat{u}(k+i\,|\,k)\|_{R(i)}^2 \quad (13)$$

The evaluation function V shown in equation (13) is a weight matrix weighted for each 12 norm (distance). Q is a state weight matrix, and R is a control weight matrix. Specifically, Q is a matrix in which the weight for output GTMW of the gas turbine 2, the weight for air-fuel ratio, i.e., turbine inlet temperature TIT. the weight for blade path temperature BPT, and the weight for exhaust gas temperature TEX are arranged on diagonals with the other matrix elements set to zero. R is a matrix in which the weight for change in fuel flow rate command CSO and the weight for change in IGV opening degree control command IGVCSO are arranged on diagonals with the other matrix elements set to zero. Q and R are parameters that affect the controllability. When Q is increased relative to R, quick-response in control is improved, but stability is reduced. Conversely, when R is increased, quick-response in control is reduced, but stability is improved.

The optimization unit 120 may be configured to optimize the control input u(t), based on a constraint condition for constraining any one or more of the change rate of the control input u(t), the absolute value of the control input u(t), or the absolute value of the state quantity x. In this case, for example, the control input u(t) can be determined so as to satisfy the operational constraint condition of the gas turbine 2.

As the constraint condition for the change rate of the control input u(t), for example, a constraint condition for satisfying −10(%/sec)<change rate of fuel flow rate command CSO<10(%/sec) may be set. As the constraint condition for the change rate of the control input u(t), for example, a constraint condition for satisfying −10(deg/sec)<change rate of inlet guide vane opening degree control command IGVCSO<10(deg/sec) may be set.

As the constraint condition for the absolute value of the control input u(t), for example, a constraint condition for satisfying 0(%)<absolute value of fuel flow rate command CSO<100(%) may be set. As the constraint condition for the absolute value of the control input u(t), for example, a constraint condition for satisfying −8(deg)<absolute value of inlet guide vane opening degree control command IGVCSO<46(deg) may be set. As a constraint condition for the absolute value of the state quantity x, for example, a constraint condition for satisfying the condition that the turbine inlet temperature is less than 1650° C. may be set. Such constraint conditions may be used in combination.

The control device 100 may be configured to execute the process of predicting the state quantity x, the process of updating one or more coefficients included in the matrices A, B, and the process of optimizing the control input u(t) at each control cycle. That is, the control device 100 may execute these processes each time one control cycle elapses.

(Update of Coefficient)

An example of coefficient updating of the prediction equation by the update unit 140 will now be described specifically. As described above, the update unit 140 reads the sensitivity information corresponding to the operating condition assumed in the prediction horizon from the storage unit 130, and updates one or more coefficients of the prediction equation of the state quantity used in the prediction model.

The sensitivity information corresponding to the operating condition assumed in the prediction horizon may be sensitivity information corresponding to the current operating condition. The sensitivity information may be a performance table of the gas turbine 2. FIG. 4 is a diagram of an example of the performance table stored in the control device 100 according to an embodiment.

For example, the performance table is an information table in which information indicating atmospheric temperature, information indicating inlet guide vane opening degree, information indicating output of the gas turbine 2, information indicating turbine inlet temperature, and information indicating exhaust gas temperature are associated with each other as state quantities. For example, as shown in FIG. 4, the information table may be provided for each atmospheric temperature, and multiple state quantities subject to the atmospheric temperature may be associated in the information table.

In the example shown in FIG. 4, the value of inlet guide vane opening degree IGV (deg), the value of output GTMW (MW) of the gas turbine 2, the value of turbine inlet temperature TIT (° C.), and the value of exhaust gas temperature TEX (° C.) when the atmospheric temperature is 30° C. are associated with each other. In FIG. 4, only four state quantities are shown, but other state quantities (for example, air flow rate GI and fuel flow rate Gf) may also be associated. Although omitted in FIG. 4, in the performance table, when one state quantity is changed, the values of the other state quantities can be read. That is, values are continuous in the vertical direction of the table.

As shown in FIG. 4, the performance table may be numerical discrete data indicating the state quantities. However, as the operating condition, not only the discrete numerical values shown in the performance table but also the linear interpolation values may be used. Further, as described above, the performance table stored in the storage unit 130 may be updated by the table update unit 170, based on actual data acquired during actual operation.

The operating condition is information indicating one or more state quantities acquired by the state quantity acquisition unit 150 among the state quantities contained in the performance table. For example, the state quantity to be acquired as the operating condition may be any three of atmospheric temperature, output GTMW, inlet guide vane opening degree IGVdeg, turbine inlet temperature TIT, and exhaust gas temperature TEX. In the example shown in FIG. 4, since the information table for each atmospheric temperature is used, it is indispensable to acquire the atmospheric temperature among the operating conditions. In FIG. 4, four state quantities are located on the left, and the other state quantities are omitted. This means that if the operating conditions of the four state quantities are known, other state quantities can be additionally obtained from the information table.

The performance table contains a plurality of sensitivity coefficients: k_Gf_IGV, k_GTMW_Gf, k_GTMW_Gf, k_TIT_Gf, k_TIT_GI, k_TBP_Gf, k_TBP_GI, k_TEX_Gf, and k_TEX_GI, for example. As described above, the sensitivity coefficients are coefficients indicating the sensitivity of the previous parameter to a change in the later parameter indicated by the signs. These sensitivity coefficients can be obtained by dividing the numerical values in the performance table by each other.

The update unit 140 can acquire one or more coefficients included in the prediction equation from such a performance table, that is, sensitivity information. The update unit 140 can update the coefficients (i.e., matrices A and B) of the prediction equation, using the acquired coefficients.

Figure 5:
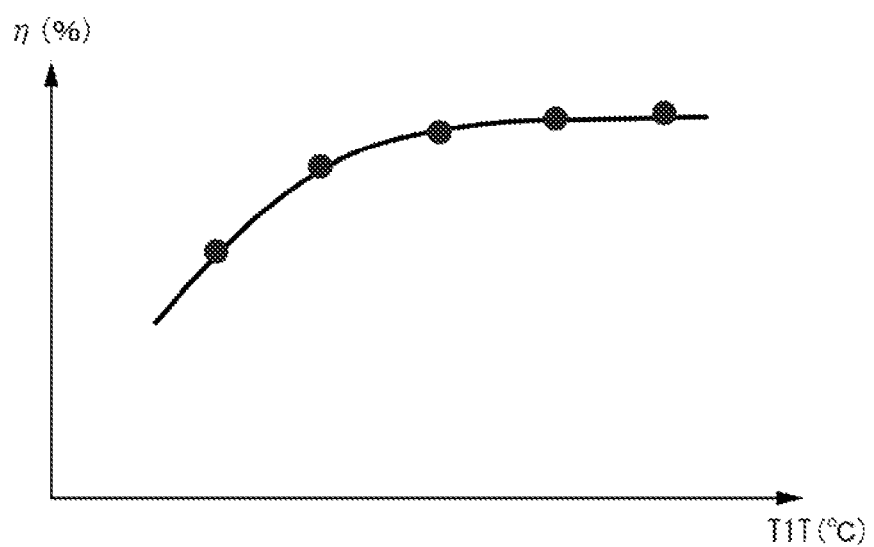
FIG. 5 is a graph showing an exemplary relationship between turbine inlet temperature and combustion efficiency of the gas turbine according to an embodiment.

FIG. 5 is a graph showing an exemplary relationship between turbine inlet temperature TIT and combustion efficiency η of the gas turbine 2 according to an embodiment. As shown in FIG. 5, combustion efficiency η changes depending on turbine inlet temperature TIT. The change in combustion efficiency η greatly affects the sensitivity coefficient (second sensitivity coefficient) related to fuel flow rate Gf.

Therefore, the update unit 140 preferably corrects the coefficient (second sensitivity coefficient) indicating sensitivity of one or more state quantities or output GTMW, turbine inlet temperature TIT, blade path temperature TBP, or exhaust gas temperature TEX to a change in fuel flow rate Gf, based on the change rate of combustion efficiency q with respect to turbine inlet temperature TIT. For example, the update unit 140 may be configured to correct, among the sensitivity coefficients contained in the performance table, the second sensitivity coefficients k_GTMW_Gf, k_TIT_Gf, k_TBP_Gf, and k_TEX_Gf in consideration of combustion efficiency η.

(Function of Control Device 100)

Figure 6:
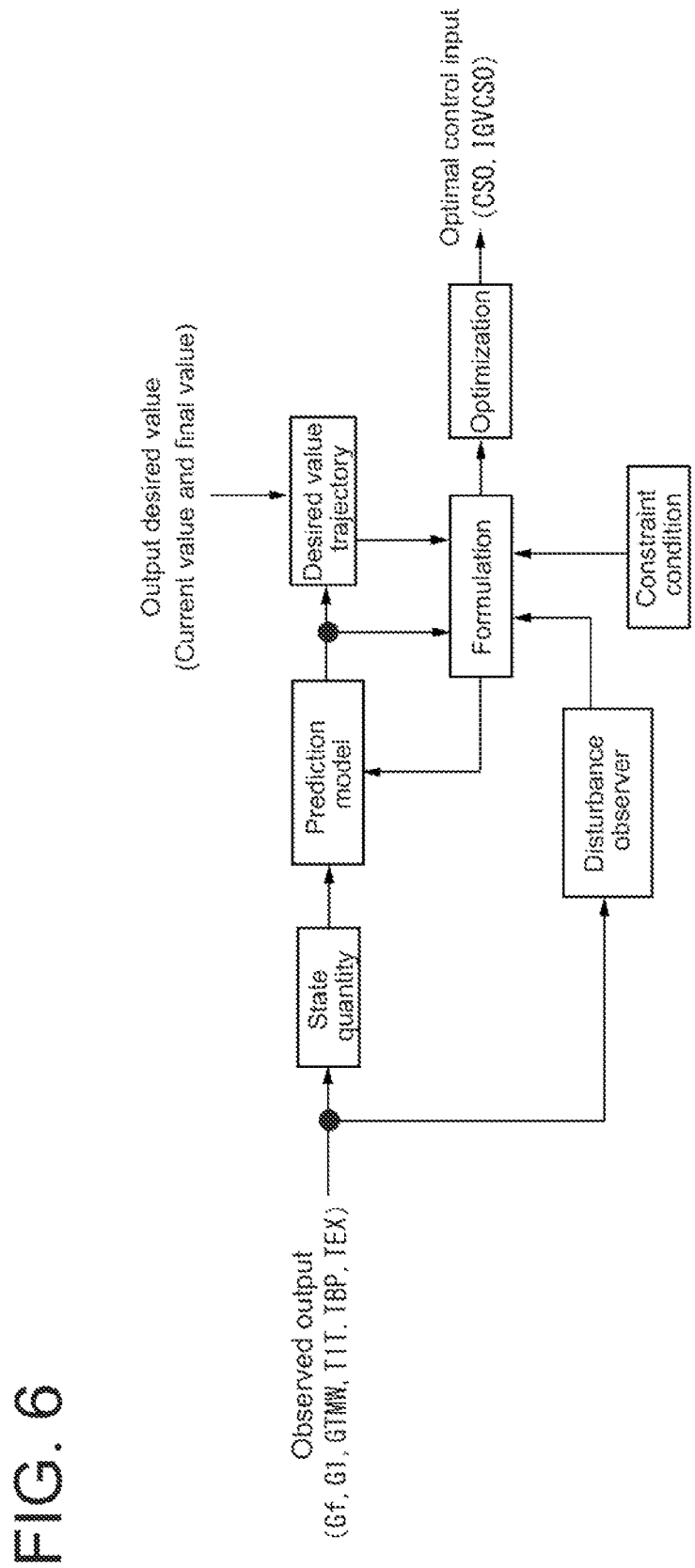
FIG. 6 is a block diagram for describing the function of the control device according to an embodiment.

The function of the control device 100 will now be described. FIG. 6 is a block diagram for describing the function of the control device 100 according to an embodiment.

First, the control device 100 acquires an observed output (measured values of Gf, GI, GTMW, TIT, TBP, and TEX). The state quantity acquisition unit 150 acquires a state quantity of Gf, GI, GTMW, TIT, TBP, TEX from the observed output. The observed output may be used as input data of a disturbance observer in the optimization unit 120. The output data of the disturbance observer may be used for formulation in the optimization (i.e., coefficient update of prediction equation and calculation of evaluation function).

Further, the control device 100 acquires a current output desired value and a final output desired value. They may be based on values determined by the user operation. The desired value trajectory acquisition unit 160 acquires a desired value trajectory from these desired values. The prediction unit 110 predicts a future state quantity using a prediction model, based on the state quantity input from the state quantity acquisition unit 150. At this time, the update unit 140 may update a coefficient of the prediction equation based on sensitivity information of the storage unit 130. Further, the update unit 140 formulates a calculation expression of an evaluation function V using the desired value trajectory and the prediction model. The optimization unit 120 calculates the evaluation function while obtaining the prediction result and optimizes the control input. When the optimal control input is determined, this control input (e.g., CSO or IGVCSO) is output.

Thus, the control device 100 determines the optimal control input. Such a control input determination method may be executed based on a control input determination program. Further, the control device 100 may be configured to execute control of the gas turbine 2 according to the control input optimized by the optimization unit 120.

The present disclosure is not limited to the embodiments described above, but includes modifications to the embodiments described above, and embodiments composed of combinations of those embodiments.

CONCLUSION

The contents described in the above embodiments would be understood as follows, for instance.

(1) A control device (100) according to the present disclosure is a control device for controlling a gas turbine (2), comprising: a prediction unit (110) configured to predict a future state quantity of the gas turbine (2) corresponding to a control input to the gas turbine (2) in a prediction horizon, using a prediction model; an optimization unit (120) configured to optimize the control input in at least a part of the prediction horizon, using a prediction result of the prediction unit (110); a storage unit (130) for storing sensitivity information indicating sensitivity of the control input to a change speed of the state quantity for each operating condition of the gas turbine (2); and an update unit (140) configured to read the sensitivity information corresponding to the operating condition assumed in the prediction horizon from the storage unit (130), and update one or more coefficients of a prediction equation of the state quantity used in the prediction model.

According to the above configuration (1), the optimization can be performed while updating one or more coefficients of the prediction equation according to the operating condition, so that more dynamic optimization calculation can be performed. As a result, the prediction accuracy is improved, so that the control performance can be improved.

(2) In some embodiments, in the above configuration (1), the control device (100) is configured to execute a process of predicting the state quantity, a process of updating the one or more coefficients, and a process of optimizing the control input at each control cycle.

According to the above configuration method (2), since the control input is reviewed every control cycle, the prediction accuracy is improved.

(3) In some embodiments, in the above configuration (1) or (2), the optimization unit (120) determines the control input so that a value of the control input changes in a control horizon shorter than the prediction horizon, determines the control input so that a value of the control input is constant alter the control horizon in the prediction horizon, and inputs the determined control input in the prediction horizon to the prediction unit (110).

According to the above configuration (3), since the control input is determined by predicting the distant future in the prediction horizon longer than the control horizon, the accuracy of optimization is improved. Further, in the above configuration, the control input is determined to change the value within the control horizon and thereafter determined to have a constant value. Thus, it is possible to secure the accuracy of optimization for the control input in the near future, which is highly important, while suppressing the amount of calculation.

(4) In some embodiments, in any one of the above configurations (1) to (3), the control device (100) comprises a desired value trajectory acquisition unit (160) configured to acquire a desired value trajectory of at least one parameter of the state quantity. The optimization unit (120) determines the optimal control input so as to decrease an evaluation function. The evaluation function includes a first item indicating an error between the desired value trajectory and a controlled variable in the prediction horizon, and a second item indicating a cumulative value of change amount of the control input in the control horizon.

According to the above configuration (4), the control input can be determined so that the controlled variable changes in a trajectory close to the desired value trajectory, and the cumulative change amount of the control input can be reduced. In this case, the accuracy and stability in control can be improved.

(5) In some embodiments, in any one of the above configurations (1) to (4), the state quantity includes information on at least one of fuel flow rate, air flow rate, output, turbine inlet temperature, blade path temperature, or exhaust gas temperature of the gas turbine (2). The control input includes at least one of a fuel flow rate command or an inlet guide vane opening degree control command.

According to the above configuration (5), an appropriate control input can be determined for control of the gas turbine (2).

(6) In some embodiments, in any one of the above configurations (1) to (5), the control device (100) comprises a desired value trajectory acquisition unit (160) configured to acquire a desired value trajectory of a parameter of at least one of turbine inlet temperature or output of the gas turbine (2) of the state quantity. The optimization unit (120) optimizes the control input, based on an evaluation function that depends on a deviation between the desired value trajectory and the parameter.

The gas turbine (2) is required to have improved load responsiveness. In this regard, according to the above configuration (6), it is possible to acquire and optimize the desired value trajectory for at least one of output of the gas turbine (2) or turbine inlet temperature, which are important indicators in the control performance of the load responsiveness.

(7) In some embodiments, in any one of the above configurations (1) to (6), the control device (100) further comprises a state quantity acquisition unit (150) configured to acquire the state quantity of the gas turbine. The storage unit (130) stores a performance table of the gas turbine (2) as the sensitivity information. The performance table is an information table in which information indicating atmospheric temperature, information indicating inlet guide vane opening degree, information indicating output of the gas turbine (2), information indicating turbine inlet temperature, and information indicating exhaust gas temperature are associated with each other as state quantities. The operating condition is information indicating three state quantities acquired by the state quantity acquisition unit (150) among the state quantities contained in the performance table.

According to the above configuration (7), one or more coefficients can be obtained based on the state quantities related to the control performance of the gas turbine (2), so that an appropriate control input can be determined for control of the gas turbine (2).

(8) In some embodiments, in the above configuration (7), the detection device (100) comprises a table update unit (170) configured to update the performance table, based on actual data acquired during actual operation.

According to the above configuration (8), even if there is aged deterioration or characteristic change, the performance table is updated based on actual data, so that the deterioration of the control performance can be suppressed.

(9) In some embodiments, in any one of the above configurations (1) to (8), the state quantity includes information on at least one of fuel flow rate, air flow rate, output, turbine inlet temperature, blade path temperature, or exhaust gas temperature of the gas turbine (2). The update unit (140) corrects a coefficient indicating sensitivity of one or more state quantities of the output, the turbine inlet temperature, the blade path temperature, or the exhaust gas temperature to a change in the fuel flow rate, based on a change rate of combustion efficiency with respect to the turbine inlet temperature.

In the gas turbine (2), if the turbine inlet temperature is low and the combustion efficiency is low, the desired output may not be obtained even by increasing the fuel flow rate. In this regard, according to the above configuration (9), since the coefficient is corrected according to the change rate of combustion efficiency with respect to the turbine inlet temperature, the prediction accuracy can be improved.

(10) In some embodiments, in any one of the above configurations (1) to (9), the optimization unit (120) optimizes the control input, based on a constraint condition for constraining any one or more of a change rate of the control input, an absolute value of the control input, or an absolute value of the state quantity.

According to the above configuration (10), the control input can be determined so as to satisfy the operational constraint condition of the gas turbine (2).

(11) In some embodiments, in any one of the above configurations (1) to (10), the control device (100) is configured to execute control of the gas turbine (2), according to the control input optimized by the optimization unit (120).

According to the above configuration (11), it is possible to control the gas turbine (2) with the prediction accuracy of the control device (100).

(12) A control input determination method according to the present disclosure comprises: a step of predicting a future state quantity of a gas turbine (2) corresponding to a control input to the gas turbine (2) in a prediction horizon by a prediction model; a step of optimizing the control input in at least a part of the prediction horizon, using a prediction result of the prediction step; a step of storing sensitivity information indicating sensitivity of the control input to a change speed or the state quantity for each operating condition of the gas turbine in a storage unit (130); and a step of reading the sensitivity information corresponding to the operating condition assumed in the prediction horizon from the storage unit (130), and updating one or more coefficients of a prediction equation of the state quantity used in the prediction model.

According to the above method (12), the optimization can be performed while updating one or more coefficients of the prediction equation according to the operating condition, so that more dynamic optimization calculation can be performed. As a result, the prediction accuracy is improved, so that the control performance can be improved.

(13) A control input determination program according to the present disclosure is configured to cause a computer to execute: a process of predicting a future state quantity of a gas turbine (2) corresponding to a control input to the gas turbine (2) in a prediction horizon, using a prediction model; a process of optimizing the control input in at least a part of the prediction horizon, using a prediction result of the prediction process; a process of storing sensitivity information indicating sensitivity of the control input to a change speed of the state quantity for each operating condition of the gas turbine (2) in a storage unit (130); and a process of reading the sensitivity information corresponding to the operating condition assumed in the prediction horizon from the storage unit (130), and updating one or more coefficients of a prediction equation of the state quantity used in the prediction model.

According to the above program (13), the optimization can be performed while updating one or more coefficients of the prediction equation according to the operating condition, so that more dynamic optimization calculation can be performed. As a result, the prediction accuracy is improved, so that the control performance can be improved.

REFERENCE SIGNS LIST

1 Power generation device
2 Gas turbine
3 Compressor
4 Combustor
5 Turbine
7 Generator
8A, 8B Rotational shaft
100 Control device
110 Prediction unit
120 Optimization unit
130 Storage unit
140 Update unit
150 State quantity acquisition unit
160 Desired value trajectory acquisition unit
170 Table update unit

The invention claimed is:

1. A control device for controlling a gas turbine, comprising:
a processor; and
a first non-transitory memory having stored thereon instructions, which when executed, cause the processor to perform:
predicting a future state quantity of the gas turbine corresponding to a control input to the gas turbine in a prediction horizon, using a prediction model and assuming an operating condition;
optimizing the control input in at least a part of the prediction horizon, using a prediction result of the predicting;
storing, in a second non-transitory memory, sensitivity information indicating sensitivity of the control input to a change speed of a state quantity for each of a plurality of operating conditions of the gas turbine;
reading the sensitivity information corresponding to the operating condition assumed in the prediction horizon from the second non-transitory memory, and updating one or more coefficients of a prediction equation of the state quantity used in the prediction model; and
controlling the gas turbine according to the optimized control input.

2. The control device according to claim 1,
wherein the control device is configured to execute a process of predicting the state quantity, a process of updating the one or more coefficients, and a process of optimizing the control input each time a control cycle elapses.

3. The control device according to claim 1,
wherein the processor determines the control input so that a value of the control input changes in a control horizon shorter than the prediction horizon, determines the control input so that a value of the control input is constant after the control horizon in the prediction horizon, and uses the determined control input in the prediction horizon.

4. The control device according to claim 1,
wherein the processor acquires a desired value trajectory of at least one parameter of the state quantity,
wherein the processor determines the optimal control input so as to decrease an evaluation function, and
wherein the evaluation function includes a first item indicating an error between the desired value trajectory and a controlled variable in the prediction horizon, and a second item indicating a cumulative value of change amount of the control input in the control horizon.

5. The control device according to claim 1,
wherein the state quantity includes information on at least one of fuel flow rate, air flow rate, output, turbine inlet temperature, blade path temperature, or exhaust gas temperature of the gas turbine, and
wherein the control input includes at least one of a fuel flow rate command or an inlet guide vane opening degree control command.

6. The control device according to claim 1,
wherein the processor acquires a desired value trajectory of a parameter of at least one of turbine inlet temperature or output of the gas turbine of the state quantity, and
wherein the processor optimizes the control input, based on an evaluation function that depends on a deviation between the desired value trajectory and the parameter.

7. The control device according to claim 1,
wherein the processor acquires the state quantity of the gas turbine,
wherein the second non-transitory memory stores a performance table of the gas turbine as the sensitivity information,
wherein the performance table is an information table in which information indicating atmospheric temperature, information indicating inlet guide vane opening degree, information indicating output of the gas turbine, information indicating turbine inlet temperature, and information indicating exhaust gas temperature are associated with each other as state quantities, and
wherein each of the plurality of operating conditions is information indicating three state quantities acquired among the state quantities contained in the performance table.

8. The control device according to claim 7, wherein the processor updates the performance table, based on actual data acquired during actual operation.

9. The control device according to claim 1,
wherein the state quantity includes information on at least one of fuel flow rate, air flow rate, output, turbine inlet temperature, blade path temperature, or exhaust gas temperature of the gas turbine, and
wherein the processor corrects a coefficient indicating sensitivity of one or more state quantities of the output, the turbine inlet temperature, the blade path temperature, or the exhaust gas temperature to a change in the fuel flow rate, based on a change rate of combustion efficiency with respect to the turbine inlet temperature.

10. The control device according to claim 1,
wherein the processor optimizes the control input, based on a constraint condition for constraining any one or more of a change rate of the control input, an absolute value of the control input, or an absolute value of the state quantity.

11. A control input determination method, comprising:
predicting a future state quantity of a gas turbine corresponding to a control input to the gas turbine in a prediction horizon by a prediction model and assuming an operating condition;
optimizing the control input in at least a part of the prediction horizon, using a prediction result of the predicting;
storing, in a non-transitory memory, sensitivity information indicating sensitivity of the control input to a change speed of the state quantity for each of a plurality of operating conditions of the gas turbine; and
reading the sensitivity information corresponding to the operating condition assumed in the prediction horizon from the non-transitory memory, and updating one or more coefficients of a prediction equation of the state quantity used in the prediction model; and
controlling the gas turbine according to the optimized control input.

12. A first non-transitory memory having stored therein a control input determination program, which when executed, causes a computer to execute:
predicting a future state quantity of a gas turbine corresponding to a control input to the gas turbine in a prediction horizon, using a prediction model and assuming an operating condition;
optimizing the control input in at least a part of the prediction horizon, using a prediction result of the predicting;

storing, in a second non-transitory memory, sensitivity information indicating sensitivity of the control input to a change speed of the state quantity for each of a plurality of operating conditions of the gas turbine; and reading the sensitivity information corresponding to the operating condition assumed in the prediction horizon from the second non-transitory memory, and updating one or more coefficients of a prediction equation of the state quantity used in the prediction model; and controlling the gas turbine according to the optimized control input.

* * * * *